April 6, 1943.    S. B. TERRY ET AL    2,315,747
TOTALIZER FOR ROLLING MILLS
Filed July 17, 1940
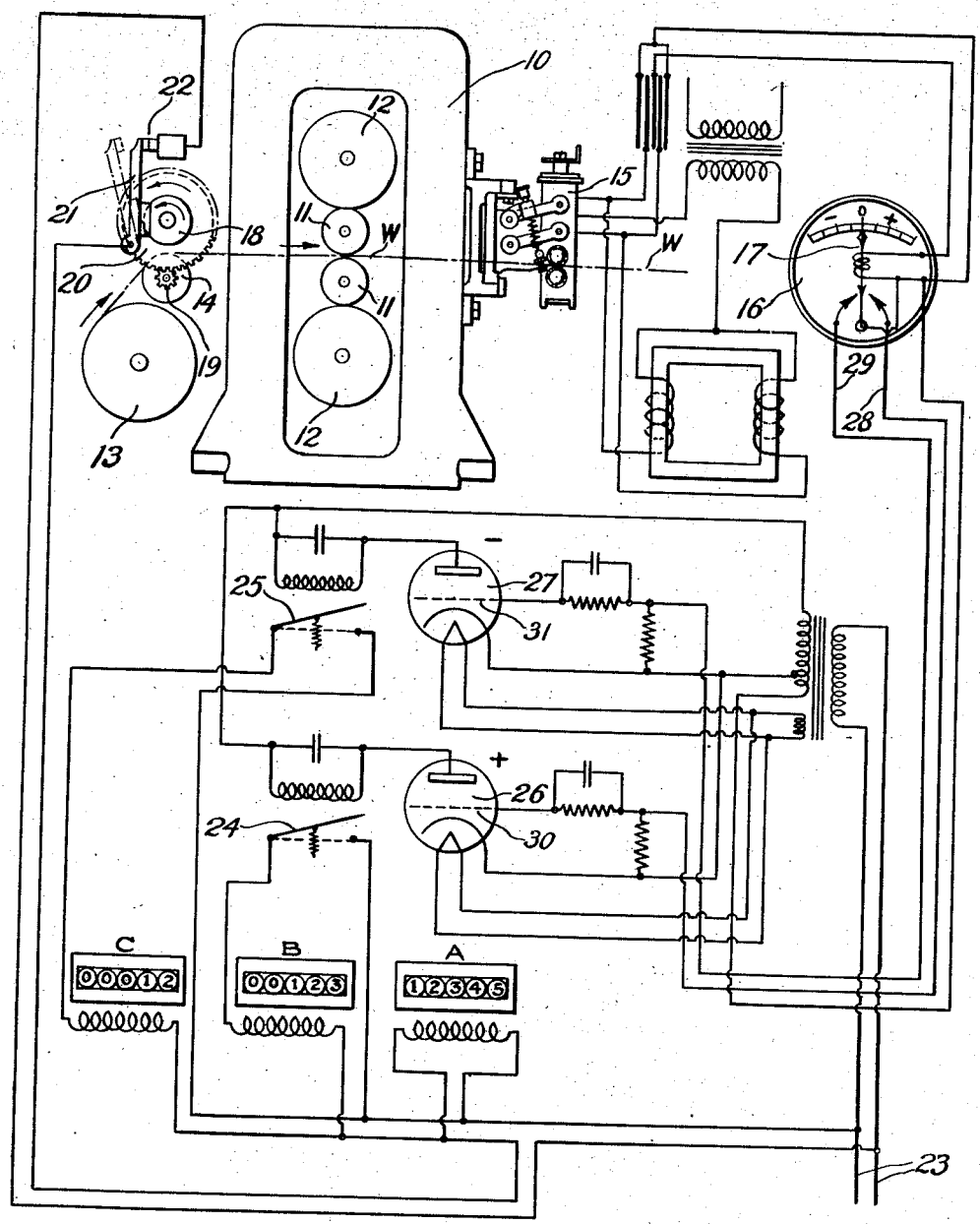
INVENTOR
S. B. TERRY
R. S. FOX
BY
Joseph K. Schofield
ATTORNEY Patented Apr. 6, 1943

2,315,747

UNITED STATES PATENT OFFICE 2,315,747

TOTALIZER FOR ROLLING MILLS

Spencer B. Terry, West Hartford, and Raymond S. Fox, Canton, Conn., assignors to Niles-Bement-Pond Company, West Hartford, Conn., a corporation of New Jersey Application July 17, 1940, Serial No. 345,918

8 Claims. (Cl. 33—129)

This invention relates to metal rolling machines and particularly to equipment to determine the total length of material rolled within predetermined gage limits.

A primary object of this invention is to actuate one or more counters or totalizers to indicate the length of material being rolled within tolerances determined by adjustments applied directly to a gage indicating instrument indicating the thickness of the material being rolled.

A feature that enables me to accomplish the above-named object is that a pluraltiy of counters or totalizers are operatively connected to the rolling mill, each of the counters being connected to the rolling mill and its equipment so that one of the counters may indicate the total length of material that has been rolled, another of which will totalize the length rolled when the gage indicates a predetermined thickness below a predetermined standard, and preferably a third counter which may indicate the length of material rolled while the gage indicates that it is slightly oversize.

In metal rolling mills it has been standard practice to allow the material being rolled, after it has passed the final rolls, to pass between the work contacting members of a gage such as the Electrolimit gage shown and described in Patent 2,007,840 granted July 9, 1935. The distance between these gaging rollers determines the thickness of the material being rolled and through appropriate electrical circuits deflects the indicating pointer of a milliammeter or other electrical instrument.

With this equipment the thickness of material being rolled is indicated and it has also been standard practice to have, in addition to the indicating gage, a recording instrument which prints or marks a record sheet to give a permanent record of the length of material rolled and the thickness thereof throughout its entire length.

Neither of the above methods of gaging enables the productive efficiency of a rolling mill to be readily determined during the rolling operation. It is obvious that the essential facts of greatest interest are first, the total amount or length of material rolled, and secondly, the length that must be rejected as being off-gage, that is, the length that is either thicker or thinner than the particular dimension determined by the customer or use for which the material is designed. It has therefore been proposed to mount counters or totalizers so that at any time the total amount of material which has been rolled can be determined; also the amount which has been rolled beyond gage limits, which limits are adjustable, can be determined.

With the above and other objects in view the invention includes the features of construction and operation set forth in the following specification and illustrated in the accompanying drawing.

In the accompanying drawing annexed hereto and forming a part of this specification, we have shown the invention embodied in a strip rolling mill but it will be understood that the invention can be otherwise embodied and that the drawing is not to be construed as defining or limiting the scope of the invention, the claims appended to this specification being relied upon for that purpose.

In the drawing the figure is a complete diagrammatic lay-out of the circuits by means of which the counters are controlled and operated.

In the above-mentioned drawing there has been shown but one embodiment of the invention which is now deemed preferable, but it is to be understood that changes and modifications may be made within the scope of the appended claims without departing from the spirit of the invention.

Briefly, and in its preferred aspect, the invention may include the following principal parts: First, a rolling mill having a continuously operating gage mounted thereon; second, an indicating instrument associated with said gage which may preferably have adjustable contacts thereon closed when the indicating pointer of the instrument moves to positions indicating predetermined dimensions respectively above and below a particular or standard dimension; third, a plurality of magnetic counters; fourth, circuits connecting said counters respectively with the contacts on said indicating instrument; and fifth, means to momentarily energize said circuits in timed relation to the traverse movement of the material being rolled.

Referring more in detail to the figure of the drawing, there is shown at 10 a standard form of rolling mill through which material in the form of metal strip is rolled between working rollers 11 supported as usual by backing-up rollers 12. The material W being rolled is shown as being unwound from a reel 13 at one side of the mill 10 and passing over an idler roll 14 which presently will be referred to more in detail.

On the opposite side of the mill is a gage 15 having gaging rollers contacting the upper and lower surfaces of the material being rolled. The distance between these rollers therefore varies with the thickness of the material W. Associated with this gage 15 is an electrical instrument 16 having a movable pointer 17 indicating the variations in gage or thickness of the material after it has been rolled. The particular gage 15 and indicating instrument 16 shown and described in this application correspond closely with those shown in the above-referred to patent. The variations in thickness of the material being rolled from a predetermined thickness are shown by the different positions of the instrument pointer 17 relative to its scale, as more fully described in the above-mentioned patent.

In addition to the above described indicator 16 there are provided three counters A, B and C. These may be of the well-known magnetic type actuated by a single momentary impulse of current to advance the counter dial reading by one digit only. To actuate these counters current from any suitable source is conducted to them by a circuit having a make and break connection actuated by a rotating cam 18. Two of the counters in addition have contacts in their circuits which are closed only when the indicator pointer 17 is in a position indicating predetermined dimensions respectively above or below the standard dimension for which the gage is set.

As shown in the figure the idler roll 14 of the mill previously mentioned over which the material being rolled passes is provided with a pinion 19 in mesh with a larger gear 20 of a suitable gear train, the final driven shaft of which is provided with the cam 18. Rotation of this cam 18 actuates a lever 21 to open and close contacts 22 in the circuit for the counters A, B and C so that each time the contacts 22 are closed a current will flow through this circuit. As the idler roll 14 is rotated by the material W there will be a momentary flow of current periodically and in relation to the length of material rolled.

Directly connected in the circuit closed by contacts 22 and supplied by leads 23 is the operating solenoid for counter A so that, with each closing of the contacts 22 its numeral wheels will be actuated to advance the number by one digit. The closing of the contacts 22 by the cam 18 rotated by the idler shaft 14 will be in timed relation to the passage of material W through the rolls 11; that is, each unit of length of material passing over and rotating the idler roll 14 will energize the circuit and operate one or more of the counters A, B and C. The counter A, therefore, the circuit of which does not include the gage 16, will indicate the total length of material W rolled by the mill. The counters B and C have their circuits connected to the gage 16 in a manner presently to be described, so that counter B will indicate the length of material rolled when the gaging limit is exceeded and counter C will be actuated whenever the material rolled is thinner than that for which the gage 16 has been adjusted.

In order to actuate counters B and C their circuits are closed respectively by suitable magnetic relays 24 and 25, these relays being closed when their coils are deenergized and being opened to render the counters inoperative when the circuits to their coils are energized. To individually control these relays 24 and 25 a typical form of grid controlled electronic circuit is provided, energy being derived from a suitable source such as the leads 23 and the anode-cathode circuits of tubes 26 and 27 including parts of transformer secondaries. The grid circuits, however, suitably biased as shown, are connected to and permit passage of a control current when the pointer 17 of the indicating instrument 16 has moved from its central position far enough to contact the terminal of a lead 28 or 29. This provides a potential in one or the other of the grids 30 or 31 for these tubes 26 or 27. When there is no potential applied to a grid 30 or 31, which occurs when its lead 28 or 29 is out of contact with the indicating instrument pointer 17, current will flow through the tube circuit energizing the coil and holding that relay 24 or 25 open. As soon, however, as the indicating pointer 17 of the instrument 16 moves from its neutral or central position far enough to contact the terminal of one of the leads 28 or 29, current will flow through tube 26 or 27, depending upon which lead 28 or 29 is contacted. The current through that particular tube 26 or 27 thus permits the particular relay 24 or 25 connected thereto to close. While a relay 24 or 25 remains closed its particular counter B or C controlled thereby will be operated by being advanced one digit each time the contacts 22 in the energizing circuit therefor are momentarily closed. As the contacts 22 are closed each time a definite length of material passes over idler roll 14 and through the mill the counter A will indicate the total length of material rolled. Counter B will indicate the total length of material rolled oversize by an amount determined by the adjustment of the terminal of lead 28 for the grid 30 relative to the pointer 17 of the instrument 16. Similarly the counter C when the terminal of lead 29 for grid 31 contacts the pointer 17 of instrument 16 will indicate the total length of material rolled below the thickness for which the gage 15 was adjusted.

The grid controlled electronic circuits shown in the diagram are of standard construction and form no part of the present invention. The relays 24 and 25 for the counters B and C respectively may be controlled by any preferred circuits opened and closed by movements of the indicator or pointer 17 of the thickness indicating instrument 16 to different oblique positions indicating variations in thickness of the material being rolled from a predetermined dimension.

What we claim is:

1. In a strip rolling mill, means to gage the thickness of the material as it is being rolled, a magnetic counter, a circuit for actuating said counter, and means operated by said mill and controlled by said gage to periodically energize said circuit only when said gage is indicating beyond a predetermined range of thicknesses, whereby the total length of material rolled beyond said predetermined range may be determined.

2. In a strip rolling mill, a gage to determine the thickness of material as it is being rolled, a counter operatively connected to a rotating member of the mill to indicate the total length of the material being rolled, a second counter on the mill operatively connected to said gage, and an electrical circuit for said second counter and gage closed momentarily as unit lengths of material pass said gage and said gage indicates a thickness beyond a predetermined limit, whereby the total length of material rolled beyond predetermined thicknesses may be determined.

3. In a strip rolling mill, a gage to determine the thickness of the material as it is being rolled, contacts on said gage closed when said gage indicates a predetermined thickness above and below a predetermined limit, a counter operatively connected to a rotating member of the mill to indicate the total length of the material rolled, a second counter on the mill operatively connected to said gage, and an electrical circuit between said second counter and said gage, said circuit being closed momentarily as equal lengths of material are rolled and when one of said gage contacts are closed, whereby said second counter will measure the total length of material rolled having a thickness beyond a predetermined limit.

4. A device for measuring continuously moving material while it is being gaged, comprising in combination, a gage contacting said material and having an electric indicating instrument to indicate variations in a dimension of said material, a magnetic counter, and a circuit connecting said gage and counter and momentarily energized when unit lengths of material pass said gage, whereby said counter is operated only when said instrument indicates a dimension beyond said predetermined limit.

5. A device for measuring continuously moving material while it is being gaged, comprising in combination, a gage contacting said material and having an electric indicating instrument indicating variations in a dimension of said material, contacts on said instrument closed when said instrument indicates a dimension beyond a predetermined limit, a magnetic counter, a circuit connecting said gage and counter, and means to close said circuit when said contacts are closed and unit lengths of material pass said gage, whereby said counter is operated only when said instrument indicates a dimension beyond a predetermined limit.

6. A device for measuring continuously moving material while it is being gaged, comprising in combination, a gage contacting said material and having an electric indicating instrument indicating variations in a dimension of said material, a magnetic counter, circuits connecting said indicating instrument and counter, whereby said counter may be operated when said instrument indicates a predetermined dimension, and means to energize said circuit as unit lengths of material pass said gage.

7. A device for measuring continuously moving material while it is being gaged, comprising in combination, a gage contacting said material and having an electric indicating instrument indicating variations in thickness of said material, contacts on said instrument closed when said material has a thickness beyond predetermined limits, a magnetic counter, circuits connecting said contacts and said counter, and means to energize said circuit momentarily as unit lengths of material pass said gage, whereby said counter may be operated periodically as predetermined lengths pass said gage.

8. A device for measuring continuously moving material while it is being gaged, comprising in combination, a gage contacting said material and having an electric indicating instrument indicating variations in thickness of said material, contacts on said instrument closed respectively when said material has a thickness above and below a predetermined limit, magnetic counters, circuits connecting said gage and said counters, means actuated by a member passed over by said material being gaged to momentarily close said circuit, whereby said counters may be operated periodically as predetermined lengths pass said gage and their contacts on said instrument are closed.

SPENCER B. TERRY.
RAYMOND S. FOX.